(12) United States Patent
Demougeot et al.

(10) Patent No.: US 8,731,797 B2
(45) Date of Patent: May 20, 2014

(54) EMPLOYING FUEL PROPERTIES TO AUTO-TUNE A GAS TURBINE ENGINE

(75) Inventors: Nicolas Demougeot, Jupiter, FL (US); Donald Gauthier, Ocean Ridge, FL (US); Peter Stuttaford, Jupiter, FL (US); Hany Rizkalla, Stuart, FL (US)

(73) Assignee: Alstom Technology Ltd., Baden (CH)

( * ) Notice: Subject to any disclaimer, the term of this patent is extended or adjusted under 35 U.S.C. 154(b) by 541 days.

(21) Appl. No.: 13/086,978

(22) Filed: Apr. 14, 2011

(65) Prior Publication Data

US 2011/0270502 A1 Nov. 3, 2011

Related U.S. Application Data

(60) Provisional application No. 61/329,830, filed on Apr. 30, 2010.

(51) Int. Cl.
*B60T 7/12* (2006.01)
(52) U.S. Cl.
USPC ............................. 701/100; 701/103; 701/104
(58) Field of Classification Search
USPC ............... 701/100, 104, 102, 103; 60/39.281, 60/776, 226.3, 226.1; 123/439; 356/128; 73/1.06, 61.42; 415/151; 702/182, 56; 382/141
See application file for complete search history.

(56) References Cited

U.S. PATENT DOCUMENTS

| 6,082,092 | A | 7/2000 | Vandervort | |
|---|---|---|---|---|
| 7,966,802 | B2 * | 6/2011 | Szepek et al. | 60/39.281 |
| 8,126,629 | B2 * | 2/2012 | Buchalter et al. | 701/100 |
| 2009/0271085 | A1 * | 10/2009 | Buchalter et al. | 701/100 |
| 2011/0160982 | A1 * | 6/2011 | Kumar et al. | 701/103 |

FOREIGN PATENT DOCUMENTS

| EP | 1645804 | 4/2006 |
|---|---|---|
| WO | 2005052450 | 6/2005 |

OTHER PUBLICATIONS

Notification of Transmittal of the International Search Report and the Written Opinion of the International Searching Authority, or the Declaration in PCT/US2011/033921, dated Aug. 10, 2011, 70 pages.
Burstein L. et al: Correlation Between Gas Molecular Weight, Heating Value and Sonic Speed Under Variable Complositions of Natural Gas, ISA Transactions, Instrument Society of America. Pittsburch, US, vol. 38, No. 4, Nov. 25, 1999, 13 pages.
International Preliminary Report on Patentability re PCT/US11/33921, dated Feb. 19, 2013, 13 pages.

* cited by examiner

*Primary Examiner* — Behrang Badii
(74) *Attorney, Agent, or Firm* — Shook, Hardy & Bacon L.L.P.

(57) ABSTRACT

A tuning process is provided for monitoring fuel properties of a fuel being consumed by a gas turbine (GT) engine, and for dynamically tuning the GT engine as a function of changes to the monitored fuel properties. Initially, readings are taken from the GT engine during a reference calibration, or commissioning, and utilized to calculate an initial-pressure-drop reference value. The tuning process during commercial operation takes post-calibration readings from the GT engine to calculate a fuel property parameter, which represents a heating value of the fuel. Specifically, the fuel property parameter is calculated by deriving a corrected-pressure-drop dynamic value as a function of pressure and temperature readings of the fuel at a point upstream of a combustor and pressure drops across fuel nozzles that introduce the fuel into the combustor, and solving a ratio of the dynamic value and the reference value.

12 Claims, 3 Drawing Sheets

EMPLOYING FUEL PROPERTIES TO AUTO-TUNE A GAS TURBINE ENGINE

CROSS REFERENCE TO RELATED APPLICATIONS

This Nonprovisional Patent Application claims the benefit of U.S. Provisional Application No. 61/329,830, filed Apr. 30, 2010, entitled "Employing Fuel Properties to Auto-Tune a Gas Turbine Engine," the teachings of which are hereby incorporated by reference in their entirety.

TECHNICAL FIELD

The present invention generally relates to automatically tuning a gas turbine engine. More specifically, a process and system are identified for providing a control system to automatically tune the gas turbine engine by adjusting for changes in fuel properties by varying the temperature of a gaseous fuel entering the combustors of the gas turbine engine.

BACKGROUND OF THE INVENTION

Gas turbine engines operate to produce mechanical work or thrust. Specifically, land-based gas turbine engines typically have a generator coupled thereto for the purposes of generating electricity. The shaft of the gas turbine engine is coupled to the generator. Mechanical energy of the shaft is used to drive a generator to supply electricity to at least a power grid. The generator is in communication with one or more elements of a power grid through a main breaker. When the main breaker is closed, electrical current can flow from the generator to the power grid when there is a demand for the electricity. The drawing of electrical current from the generator causes a load to be applied to the gas turbine. This load is essentially a resistance applied to the generator that the gas turbine must overcome to maintain an electrical output of the generator.

Increasingly, a control system is used to regulate the operation of the gas turbine engine. In operation, the control system receives a plurality of indications that communicate the current operating conditions of the gas turbine engine including pressures, temperatures, fuel flow rates, and engine frequencies. In response, the control system makes adjustments to the inputs of the gas turbine engine, thereby changing performance of the gas turbine engine based on the plurality of indications in light of look-up tables coded into the memory of the control system. Over time, this performance may fall outside a preferred operating range due to mechanical degradation of the gas turbine engine or changes in operational conditions such as ambient temperature or inlet fuel properties (e.g., temperature, pressure, and composition). For instance, the gas turbine engine may begin operating in a state where combustion of the inlet fuel causes unwanted operational dynamics, such as instability or diminished durability. By way of example, unrevealed to the gas turbine engine, the composition of the inlet fuel may have degraded to include a greater number of hydrocarbons, which exhibit a lower heating value per unit volume. Or, in another example, the inlet fuel temperature may have unexpectedly increased, where heated inlet fuel exhibits a lower heating value per unit volume.

Upon recognizing this state of reduced energy release, the control system may conventionally attempt to implement corrective measures, such as increasing a flow rate through fuel nozzles, which introduce the inlet fuel to the combustors, in order to achieve the previous level of energy release. Because these corrective measures do not directly address the issue of changed inlet fuel properties (e.g., degraded fuel composition and increased fuel temperature), blindly compensating by an increased flow rate may provoke combustion instability within the gas turbine engine, which further impairs the operational dynamics (e.g., stability and durability) thereof.

Often, manual tunings may be performed to update the control system such that it recognizes the change in fuel properties. However, manual tuning is labor intensive and can create business-related inefficiencies. For instance, manual tuning for fuel properties may involve utilizing a gas chromatograph to measure a quality (i.e., composition) of the inlet fuel via in-line, gas analysis. Extracting an accurate measurement (e.g., heating value of the inlet fuel) from the gas chromatograph generally requires a considerable amount of time. Further, because an elaborate process is required to ascertain the heating value of an inlet fuel, other conventional tools exhibit the same short-comings (e.g., ability to accurately measure fuel composition on-the-fly) as the gas chromatograph, a more robust model of detecting changes to fuel properties and for alerting the control system of the detected changes is addressed by embodiments of the present invention.

SUMMARY

In accordance with embodiments of the present invention, there is provided a robust model for monitoring fuel properties of a gaseous fuel entering a gas turbine (GT) engine and for responding to changes in the fuel properties. As discussed above, conventional tools for detecting the quality of an inlet fuel fail to provide an accurate measurement of fuel composition or inherent heating value on-the-fly. Specifically, the gas chromatograph will not detect fluctuations in fuel quality in a timely manner, and any adjustments to fuel properties based on the detected fuel quality will be delayed such that they are ineffective to cure issues with operational dynamics. Thus, systems designers are currently forced to select between blindly correcting for fuel degradation, which provokes combustion instability, or employing inefficient tools (e.g., gas chromatograph) that build in a significant delay when responding to fuel-property changes.

The robust model of the present invention, in embodiments, accounts for the technological short-comings in accurately and dynamically measuring a heating value of gaseous fuel by introducing a surrogate parameter that tracks changes to fuel properties while is manageable to measure on-the-fly. Generally, the surrogate parameter comprises a dynamic reading of the pressure drop ($\Delta P_{NG}$) of the gaseous fuel (e.g., natural gas) across a fuel nozzle leading into a combustor. Because an opening/passage formed into the fuel nozzle constitutes an orifice that causes a substantial pressure drop when accommodating a typical flow rate, the surrogate parameter is consistently and accurately calculated by dynamically measuring a fuel pressure before and after the gaseous fuel traverses the fuel nozzle. As such, the surrogate parameter may be efficiently detected and passed to the control system. Upon receipt of the surrogate parameter, it is employed by the control system to invoke appropriate operational adjustments (e.g., heating or cooling the inlet fuel), thereby avoiding any combustion-related instabilities that may result from an expected change in the fuel properties.

The surrogate parameter introduced by the model described herein may, in embodiments, serve as a substitute for calculating a Wobbe Index for the gaseous fuel being consumed by the gas turbine engine. Specifically, the Wobbe Index is used to compare the energy output during combustion of fuel gases having different compositions. That is, if two fuels have similar Wobbe Indices, within a 5% margin on either side, then, for given pressure and valve settings, the energy output will not be noticeable to a consumer.

Generally, the phrase "Wobbe Index" refers to an indicator of fuel properties (e.g., composition, temperature, and pressure of a gaseous fuel) and can be utilized to verify the interchangeability of fuel gases such as natural gas, liquefied petroleum gas (LPG), and utility-line gas. When the fuel properties of a gaseous fuel change such that the Wobbe Index of the gaseous fuel moves outside a set of predefined margins, the continued use of the changed gaseous fuel may fluctuate gas-turbine-engine dynamics and create instability problems. Typically, the Wobbe Index, WI, is calculated by the following equation:

$$WI = HV/(SG^{1/2})$$

In this standard equation, HV represents a heating value, or calorific value, while SG is the specific gravity. That is, the conventional Wobbe Index is derived by dividing the heating value of a gaseous fuel by the square root its specific gravity. As discussed above, the heating value is difficult to attain via conventional tools. As such, the novel surrogate parameter, employed by the model discussed hereinbelow, may be used as a substitute to the Wobbe Index, or any modified version(s) of the Wobbe Index, yet still function in a similar manner (i.e., to provide an indication when fuel properties have changed).

This surrogate parameter, referred to herein as the "fuel property parameter" or "FPP," is calculated by taking the ratio of a corrected pressure drop ($\Delta P_{NG\_COR}$) (numerator) and a reference pressure drop ($\Delta P_{NG\_COR\_REF}$) (denominator) that is measured and stored upon the gas turbine engine running in a commissioning mode. The corrected pressure drop ($\Delta P_{NG\_COR}$) can be quickly calculated from measurements dynamically taken from the gas turbine engine during an operating mode. In particular, the corrected pressure drop ($\Delta P_{NG\_COR}$) is calculated by the following equation:

$$\Delta P_{NG\_COR} \equiv \frac{\Delta P_{NG} \cdot P_{NG}}{T_{NG}}$$

In this equation, the product of the pressure drop across a fuel nozzle ($\Delta P_{NG}$) and the pressure of the gaseous fuel ($P_{NG}$) leading to the fuel nozzle is divided by the temperature of the gaseous fuel ($T_{NG}$) measured at a point prior to entering the combustor(s). Each of these variables $\Delta P_{NG}$, $P_{NG}$, and $T_{NG}$ can be measured dynamically while the gas turbine engine is in operational mode. Further, the variable $\Delta P_{NG\_COR\_REF}$ is known and can be accessed at any point by the control system. Accordingly, fuel property parameter (FPP) may be calculated on demand and employed at any time to determine if the fuel properties of the gaseous fuel have changed a substantial amount.

Further, the value of the FPP can be utilized to help the control system decide which corrective actions are appropriate when the changed fuel properties of the gaseous fuel have caused, or could potentially cause, combustion instability in the gas turbine engine. For instance, if the temperature of the gaseous fuel ($T_{NG}$) has increased to a point that may create unwanted operational dynamics (e.g., combustion instability or accelerated degradation of durability) while the gas turbine engine is in operational mode, the FPP may be utilized to automatically determine an amount to adjust the temperature of the gaseous fuel. In an exemplary embodiment, utilizing the FPP involves adjusting fuel properties (e.g., temperature) to bring FPP to a value substantially close to unity. Upon the FPP achieving a value near unity, the GT engine will be tuned to behave similar to when it was being calibrated, or commissioned, even when the current fuel composition does not correspond with the reference fuel composition at calibration. The temperature to target in order to bring FPP close to unity can be determined by solving the following equation:

$$T_{NG\_Target} = FPP \cdot T_{NG}$$

Upon solving the equation for the target temperature ($T_{NG\_Target}$), the control system may issue instructions to one or more devices that are programmed to carry out the instructions by taking an appropriate corrective action. Although the FPP is suited for being employed within a computerized system carrying out an automatic tuning model, the FPP may be useful when manual tuning a GT engine as well. In the example above, the corrective action may be to cool the gaseous fuel temperature ($T_{NG}$) to meet the target temperature ($T_{NG\_Target}$). In the event that this corrective action is not successful, an alarm indication may alert the operator that automatic tuning has failed to bring the fuel properties of the gaseous fuel within a predefined range, and that that manual adjustments to the combustor or the control system are recommended prior to completing tuning.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
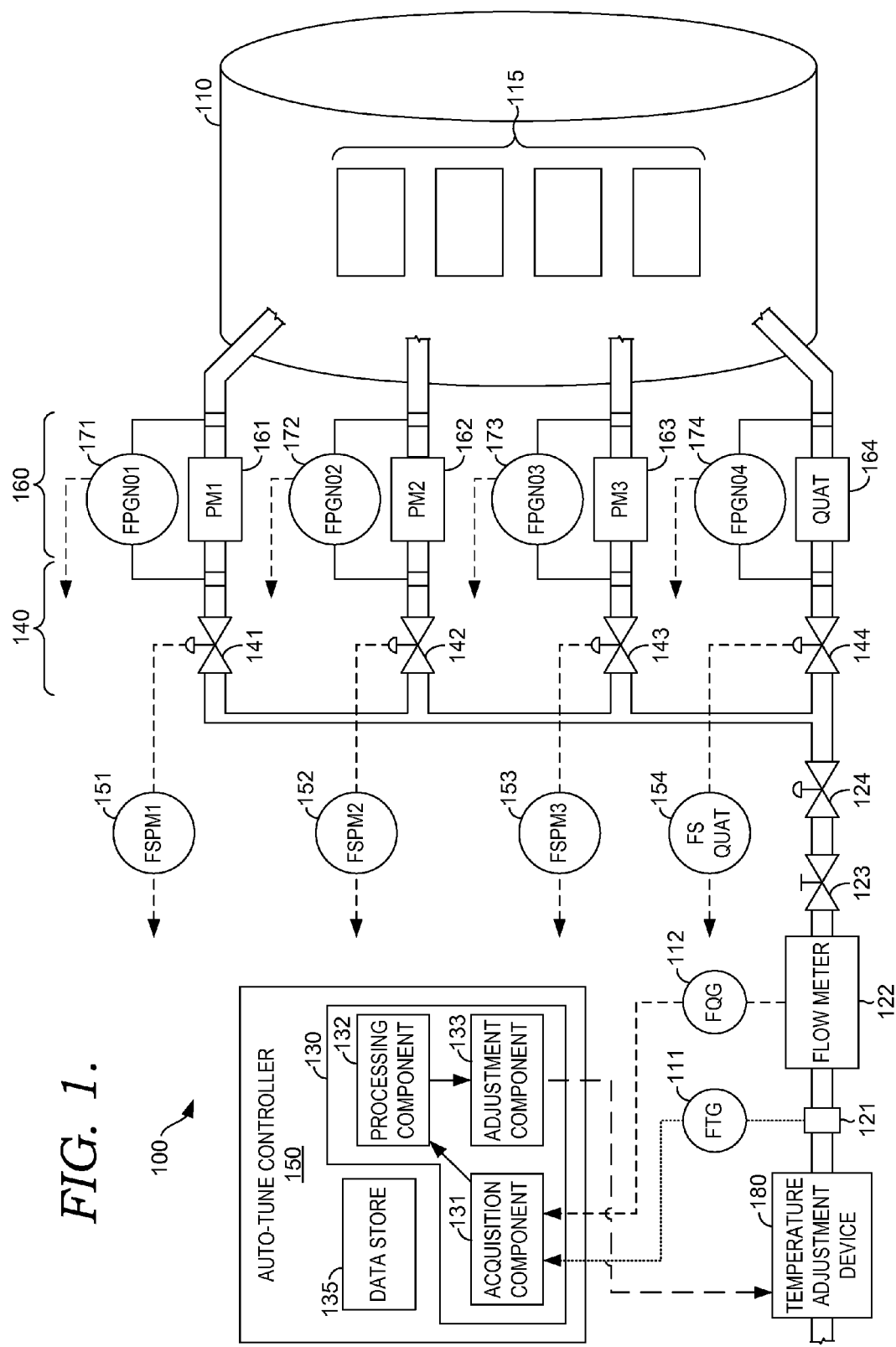
FIG. 1 is a block diagram of an exemplary tuning environment suitable for use in embodiments of the present invention.

As described above, embodiments of the present invention generally relate to automatically tuning a gas turbine engine. With reference to FIG. 1, a gas turbine engine 110 is depicted that accommodates a plurality of combustors 115. Generally, for the purpose of discussion, the gas turbine (GT) engine 110 may include any low emission combustors. In one instance, these low emission combustors may be arranged in a can-annular configuration about the GT engine 110. One type of GT engine (e.g., heavy duty GT engines) may be typically provided with, but not limited to, 6 to 18 individual combustors, each of them fitted with a combustor liner, end cover, and casings. Another type of GT engine (e.g., light duty GT engines) may be provided with fewer combustors. Accordingly, based on the type of GT engine, there may be several different fuel circuits utilized for operating the GT engine 110. Further, there may be individual fuel circuits that correspond with each of the plurality of combustors 115 attached to the GT engine 110. As such, it should be appreciated and understood that the auto-tune controller 150, and the tuning process executed thereby (see reference numeral 400 of FIG. 4), can be applied to any number of configurations of GT engines and that the type of GT engines describe hereinbelow should not be construed as limiting on the scope of the present invention.

As discussed above, the plurality of combustors 115 (e.g., low emission combustors) may be prone to elevated levels of pressure fluctuation within the combustor liner. This pressure fluctuation is referred to as "combustion dynamics." Left alone, combustion dynamics can have a dramatic impact on the integrity and life of the plurality of combustors 115, eventually leading to catastrophic failure. These combustion dynamics may be mitigated by adjusting fuel flow splits of the combustor gas flow between several groups of nozzles within the plurality of combustors 115 or by adjusting temperature of the incoming fuel. Generally, the fuel temperature is occasionally tuned to ensure that acceptable levels (conventionally low levels) of the combustion dynamics are maintained while, at the same time, promoting acceptable emission levels. The acceptable emission levels relate to the amount of pollutant that is generated by the GT engine 110. Schedules, which govern how to adjust the temperature of the fuel being consumed by the GT engine 110, are typically hard coded into a control system (not shown) of GT engine 110.

Over time, several parameters will affect the combustion dynamics. In particular ambient condition changes (e.g., heating value of the fuel) and/or gas composition variation may degrade the operation of the GT engine. This degradation leads to regular "re-tuning" of the combustor to maintain combustion dynamics and emissions within acceptable limits. As discussed herein, an automatic tuning control system, or the auto-tune controller 150 of FIG. 1, is used to assess the state of the GT engine 110 and the plurality of combustors 115 in terms of parameters such as the combustion dynamics, air flow, fuel flows, emissions, heating value of fuel, and pressure distribution. Based on those parameters, the adequate combustion dynamics are arrived upon by incrementally adjusting, or by making single specific changes to, the temperature of the fuel and/or other parameters (e.g., fuel flow splits). Accordingly, embodiments of the present invention concern the auto-tune controller 150 and the associated tuning process that enables automatic tuning of the combustion dynamics and emissions using small, consistent incremental changes of the fuel temperature.

An overall tuning process carried out by the auto-tune controller 150 may comprise one or more of the steps described immediately below. Initially, fuel properties of the fuel (e.g., natural gas) entering the plurality of combustors 115 are read and recorded during commissioning of the GT engine 100. These recorded fuel properties are passed through an algorithmic procedure, where the fuel properties are converted into a static plot of a corrected pressure drop of the fuel across nozzles leading into the combustors 115 as a function of mass flow squared. The static plot is configured to reveal a linear slope ($Slope_{NGref}$) that corresponds to a molecular weight of the fuel at commissioning.

The fuel properties are then monitored post-commissioning, converted, and dynamically plotted as a corrected pressure drop versus mass flow squared. The dynamica plot is configured to reveal a linear slope ($Slope_{NG}$) that corresponds to a molecular weight of the fuel during normal operation of the GT engine 100 port-commissioning. As discussed in more detail below, these slopes ($Slope_{NG}$ and $Slope_{NGref}$) are compared to compute a fuel property parameter (FPP). The FPP is then employed to adjust the temperature of the incoming fuel, if necessary, in order to reduce unwanted combustion dynamics or increased emissions. Once the temperature adjustment is made, the process reiterates.

Although a scheme for iteratively adjusting fuel temperature to compensate for changes in heating value has been described immediately above, it should be understood and appreciated by those of ordinary skill in the art that other types of suitable schemes that adjust temperature or other parameters may be used, and that embodiments of the present invention are not limited to those schemes that focus on one fuel flow split at a time.

Figure 4:
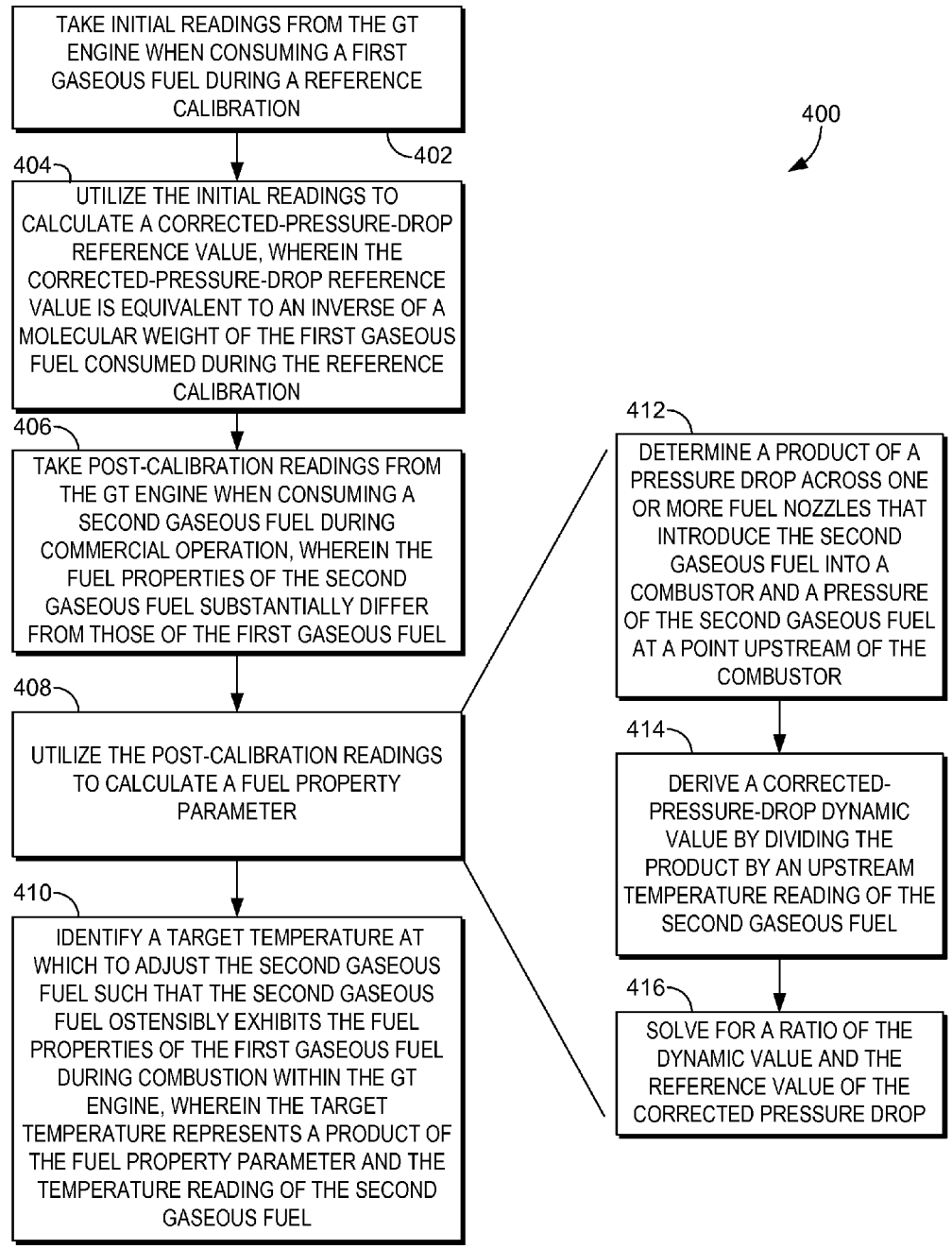
FIG. 4 is a flow diagram of an overall method for carrying out a tuning process that employs a surrogate parameter to dynamically compensate for changes in fuel properties of a gaseous fuel entering a combustor via one or more fuel nozzles, in accordance with an embodiment of the present invention.

With reference to FIGS. 1 and 4, an exemplary embodiment of the tuning process will now be described in detail. Initially, FIG. 1 illustrates an exemplary tuning environment 100 suitable for use in embodiments of the present invention. The exemplary tuning environment 100 includes the auto-tune controller 150, a temperature adjustment device 180, and the GT engine 110. The auto-tune controller 100 includes a data store 135 and a processing unit 130 that supports the execution of the acquisition component 131, the processing component 132, and the adjustment component 133. Generally, the processing unit 130 is embodied as some form of a computing unit (e.g., central processing unit, microprocessor, etc.) to support operations of the component(s) 131, 132, and 133 running thereon. As utilized herein, the phrase "processing unit" generally refers to a dedicated computing device with processing power and storage memory, which supports operating software that underlies the execution of software, applications, and computer programs thereon. In one instance, the processing unit 130 is configured with tangible hardware elements, or machines, that are integral, or operably coupled, to a computer. In another instance, the processing unit may encompass a processor (not shown) coupled to the computer-readable medium (discussed above). Generally, the computer-readable medium stores, at least temporarily, a plurality of computer software components that are executable by a processor. As utilized herein, the term "processor" is not meant to be limiting and may encompass any elements of the processing unit that act in a computational capacity. In such capacity, the processor may be configured as a tangible article that processes instructions. In an exemplary embodiment, processing may involve fetching, decoding/interpreting, executing, and writing back instructions (e.g., reconstructing the physical gestures by presenting animations of the motion patterns).

In addition, the auto-tune controller 100 is provided with the data store 135. Generally, the data store 135 is configured to store information associated with the tuning process or data generated upon monitoring the GT engine 110. In some embodiments, such information may include, without limitation, initial readings from the GT engine 110 taken during commissioning and post-commissioning readings taken during commercial operation of the GT engine 110. In addition, the data store 135 may be configured to be searchable for suitable access of stored information. For instance, the data store 135 may be searchable for schedules in order to determine whether the readings taken during commissioning are comparable to the readings taken during commercial operation. It will be understood and appreciated that the information stored in the data store 135 may be configurable and may include any information relevant to the tuning process. The content and volume of such information are not intended to limit the scope of embodiments of the present invention in any way.

As mentioned above, initial readings from the GT engine 110 may be taken during commissioning, while post-commissioning readings may be taken during commercial operation of the GT engine 110. In one instance, these readings may include a temperature 111 (FTG) measured by a temperature sensor 121, a fuel flow 112 (FQG) measured by a flow-meter sensor 122, and pressure drops 171 (FPGN01), 172 (FPGN02), 173 (FPGN03), and 174 (FPGN04) measured across the nozzles 160 leading into the combustors 115. Specifically, the pressure drops 171-174 may be measured across nozzles 161 (PM1), 162 (PM2), 163 (PM3), and 164 (PM4), respectively.

Further, when computing the pressure drop across the nozzles 160, a set of pressure sensors (not shown) may be employed to determine the pressure of the fuel upstream of the nozzles 160. Determining the upstream pressure may involve simply reading the upstream pressure of the fuel using strategically placed sensors. Or, in an exemplary embodiment, the upstream pressure may be determined by (a) measuring the ambient temperature, (b) multiplying the ambient temperature by a pressure ratio of one or more combustors 155, and (c) adding the resultant product to one of the pressure drops 171-174.

Even further, the valves 141, 142, 143, and 144 may be implemented within the fuel lines to control the fuel entering into each of the nozzles, respectively, and to relay to the acquisition component 131 the flows 151 (FSPM1), 152 (FSPM2), 153 (FSPM3), and 154 (FSQUAT) being directly to each of the nozzles 160, respectively. Upon taking these readings described above, the sensors 121, 122, and 140, deliver the readings to the acquisition component 131 for preprocessing.

In an exemplary embodiment, preprocessing may involve conditioning the readings, applying a smoothing filter to incoming signals, and/or converting the readings into appropriate units. Upon completion of the preprocessing, the conditioned readings are passed to the processing component 132 for input into a model that assists in detecting and avoiding combustion instability caused by changes in the heating value of the fuel being consumed by the GT engine 110.

The model employed by the processing component 132 will now be discussed in detail. Initially, the method for calculating mass flow ($m_{NG}$) of the fuel (e.g., natural gas) across the nozzles 160 is depicted by the following equation:

$$\dot{m}_{NG} \approx A_{\mathit{eff}} \sqrt{2\rho_{NG}\Delta P_{NG}} = A_{\mathit{eff}} \sqrt{2\frac{M_{NG}P_{NG}}{R_u T_{NG}}\Delta P_{NG}}$$

Thus, to calculate the mass flow, the effective area ($A_{\mathit{eff}}$) of one or more nozzles 160 is known and is multiplied by a square root of a ratio. The ratio includes in the numerator a product of the molecular weight ($M_{NG}$) of the fuel and the inlet pressure ($P_{NG}$) of the fuel. The denominator of the ratio includes a product of the universal gas constant ($R_u$) and the temperature ($T_{NG}$) of the fuel, which is converted from the temperature reading 111 (FTG). Also, the ratio is multiplied by a pressure drop ($\Delta P_{NG}$), which is converted from one or more of the pressure drops 171-174 measured across the nozzles 160.

Because, as stated previously, determining the molecular weight of a fuel (in order to compute the fuel's heating value) generally requires a gas chromatograph that takes a considerable amount of time to analyze the fuel and return a heating value thereof, the molecular weight is isolated from the other variables. Also, upon rearranging, molecular weight can be solved for, which is a direct surrogate for the heating value of the fuel.

Initially, as shown above, the mass flow rate of the fuel across fuel nozzle(s) is proportional to the area of the orifice formed by the nozzle(s) multiplied by the square root of the pressure drop through the nozzle(s). This equivalence may be transposed to the following equation, which isolates the molecular weight from the temperature and pressure readings:

$$\frac{\Delta P_{NG} \cdot P_{NG}}{T_{NG}} = \dot{m}_{NG}^2 \cdot \left(\frac{R_u}{2A_{eff}^2 M_{NG}}\right)$$

The ratio of the temperature and pressure readings is referred to herein as the "corrected pressure drop" ($\Delta P_{NG\_COR}$) and is determined statically during commissioning and dynamically during commercial operation of the GT engine 110. Typically, the corrected pressure drop is expressed by the following equation:

$$Slope_{NG} = \frac{\Delta P_{NG\_COR}}{\dot{m}_{NG}^2}$$

In this equation, the ratio of the corrected pressure drop over the mass flow squared is set as equivalent to the term "$Slope_{NG}$" that represents the molecular weight of the fuel. As shown, the term $Slope_{NG}$ can be solved from readings dynamically measured from the GT engine 110 during commercial operation. Also, a representation of the molecular weight ($Slope_{NGref}$) can solved from readings statically measured from the GT engine 110 during commissioning. The term $Slope_{NGref}$ is provided in the following equation:

$$Slope_{NGref} = \frac{\Delta P_{NG\_COR\_ref}}{\dot{m}_{NGref}^2}$$

As depicted in the equation above, the $Slope_{NGref}$ is equivalent to a ratio of the corrected-pressure-drop reference value ($\Delta P_{NG\_COR\_ref}$), which is calculated similar to the corrected pressure drop above, and the square of the mass flow measured during commissioning.

Figure 2:
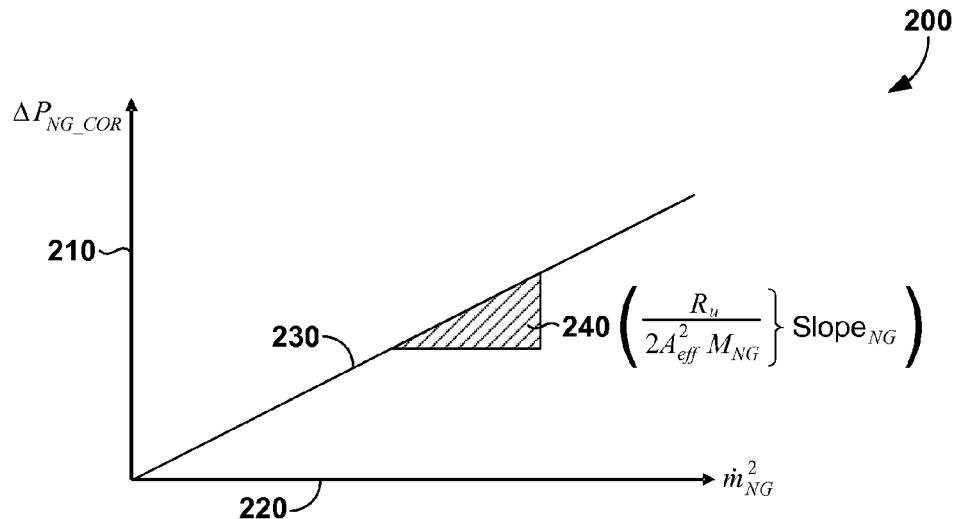
FIG. 2 is a diagrammatic depiction of an operational slope plotted on an exemplary line graph, where the y-axis of the graph represents a corrected pressure drop and the x-axis of the graph represents a mass flow rate of gaseous fuel into a combustor, in accordance with an embodiment of the present invention.

Turning now to FIG. 2, is a diagrammatic depiction of an operational slope 240 plotted on an exemplary line graph 200 is shown. Generally, this graph 200 of FIG. 2, as well as other these schedules, are generated as a function of a reference value that could be, amongst other things, a turbine inlet reference temperature (TIRF) or a load on the GT engine 110. In embodiments, the graph 200 includes a y-axis 210 that represents the corrected pressure drop measured dynamically from the GT engine 110 (corrected-pressure-drop dynamic value), and an x-axis that represents the square of the mass flow rate ($m^2_{NG}$) of gaseous fuel entering into one or more of the combustors, in accordance with an embodiment of the present invention. A linear plot 230 depicts the relationship between the corrected-pressure-drop dynamic value and the square of the mass flow rate.

As demonstrated on the graph 200, the linear plot 230 is configured with the slope 240 ($Slope_{NG}$) that represents a molecular weight of the fuel being consumed during commercial operation. In other words, when plotting the corrected-pressure-drop dynamic value as a function of the mass flow rate squared, the slope 240 of the linear plot 230 (straight line) should be the molecular weight, as they maintain a linear relationship. Thus, as long as the slope 240 is known, then the interrelated fuel properties (e.g., composition, heating value, molecular weight, etc.) are also known.

As discussed above, the molecular weight of the fuel can be employed as a surrogate for the heating value; thus, allowing for determining the heating value dynamically without the complicated and time-consuming evaluation inherent with directly determining the heating value with a gas spectrometer. In other words, because the heating value of the fuel and its molecular weight are directly proportional and related (i.e., heating value, composition, and molecular weight are all interrelated), the slope 240 that represents the molecular weight also represents the heating value of the fuel and acts as a guide when making corrections to the fuel properties in order to avoid combustion instability. Thus, although the heating value of the fuel is not read, changes in the heating value are understand relative to the slope 240.

Figure 3:
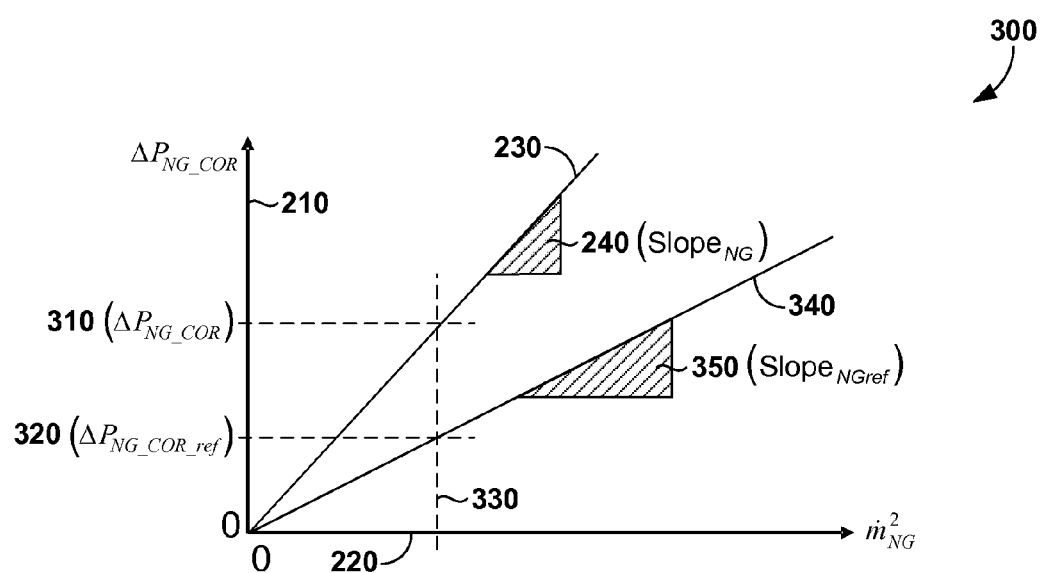
FIG. 3 is an exemplary line graph similar to FIG. 2, but having a reference slope overlaid on top of the operational slope, wherein the reference slope is generated when commissioning a gas turbine engine, in accordance with an embodiment of the present invention.

Upon properties of the fuel (e.g., composition, temperature, heating value, etc.) changing, the slope 240 will change proportionately. This is illustrated in FIG. 3. In particular, FIG. 3 show an exemplary line graph 300 similar to FIG. 2, but having a reference linear plot 340 overlaid on top of the operational linear plot 230, where the reference linear plot 340 is generated when commissioning the GT engine 110 and stored in the data store 135. As illustrated in the exemplary graph 300, the operation linear plot 230 has a slope 240 that varies from a slope 350 of the reference linear plot 340. By way of example, when the slopes 240 and 350 vary, for a given mass flow rate 330, the corrected pressure drop 310 of the fuel consumed during commercial operation may differ from the corrected pressure drop 320 of the fuel consumed during commissioning. For instance, the difference between the slopes 240 and 350 may indicate that the composition of the fuel has changed overtime.

If slopes 240 and 350 vary (caused by degradation of the natural gas) to an extent such that the fuel is no longer within its permissible limits (e.g., predefined range) of normal operation, the graph 300 facilitates detecting the degradation and indicating how to rectify any detected degradation (e.g., an amount to increase or decrease the gas temperature)

Upon determining the slopes 240 and 350, and upon determining from a variance in the slopes 240 and 350 that corrective action to adjust fuel properties is needed to ameliorate degradation that has occurred within the fuel, a fuel property parameter (FPP) may be calculated. The fuel property parameter is generally calculated by taking a ratio of the slopes 240 and 350, which represents a ratio of the molecular weights of the fuel at commissioning and during commercial operation. In one instance, with reference to FIG. 3, taking the ratio of the slopes involves taking the ratio of the corrected-pressure-drop dynamic value 310 and the corrected-pressure-drop reference value 320 at an arbitrary mass flow rate, such as the mass flow rate 330. This ratio is shown in the following equation:

$$FPP \equiv \frac{\Delta P_{NG\_COR}}{\Delta P_{NG\_COR\_ref}} = \frac{Slope_{NG}}{Slope_{NGref}} = \frac{\Delta P_{NG\_COR}}{\dot{m}_{NG}^2 \cdot Slope_{NGref}}$$

As mentioned above, the corrected-pressure-drop dynamic value 310 is found by the following equation:

$$\Delta P_{NG\_COR} = Slope_{NG} \cdot \dot{m}_{NG}^2$$

By combining these two equations immediately above, and rearranging the terms, the fuel property parameter (FPP) may be expressed by the following equation:

$$FPP = \frac{\Delta P_{NG} \cdot P_{NG}}{T_{NG}} \cdot \frac{1}{m_{NG}^2 \cdot Slope_{NGref}}$$

Each of the terms within the equation above may be dynamically measured from the GT engine 110 during commercial operation with minimal preprocessing or collected from the data store 135, which were written during commissioning. As such, the fuel property parameter may be quickly, easily, and accurately calculated by processing one or more of the readings 111, 112, and 171-174 at the processing component 132.

Once calculated, the fuel property parameter is passed to the adjustment component 133 of FIG. 1. This adjustment component 133 applies the fuel property parameter to the following equation to determine an amount of temperature to adjust the fuel in order to avoid combustion instability or other unwanted dynamics and/or emissions:

$$T_{NG\_Target} = \frac{FPP}{FPP_{Target}} \cdot T_{NG}$$

This equation immediately above uses the fuel property parameter (FPP) determined by the processing component 132 to find a target temperature ($T_{NG\_Target}$). This target temperature refers to a temperature at which the incoming fuel should be heated/cooled such that it exhibits similar properties (e.g., heating value) to the fuel consumed during commissioning. Further, although not explicitly discussed above, the target fuel property parameter ($FPP_{Target}$) may be generated from the slope 350 of the linear plot 340 generated during commissioning. Or, the target fuel property parameter may defined by some other metrics.

Once the target temperature is calculated by the adjustment component 133, when utilizing a computerized system to carry out the auto-tuning, a message is sent to the temperature adjustment device 180 that communicates the target temperature. Upon receiving the message, the temperature adjustment device 180 uses any method known in the relevant field of technology to heat the fuel more or less so that the actual fuel temperature corresponds with the target temperature. The heated fuel leaving the temperature adjustment device 180 should, when combusted, exhibit a similar heating value to the fuel that was consumed during commissioning (even if the fuel being presently consumed has a changed composition). In another embodiment, when manually tuning the GT engine 110, an indication of the target temperature (e.g., via rendering a graphical display on a user interface) may be communicated to a technician to use as a guide for adjusting the inlet-fuel temperature.

With reference to FIG. 4, a tuning process will now be discussed in light of the exemplary tuning environment 100 of FIG. 1. Generally, FIG. 4 illustrates a flow diagram of an overall method 400 for carrying out a tuning process that employs a surrogate parameter to dynamically compensate for changes in fuel properties of a gaseous fuel entering a combustor via one or more fuel nozzles (see reference numeral 160 of FIG. 1), in accordance with an embodiment of the present invention. Initially, the overall method 400 includes taking initial readings from the GT engine when consuming a first gaseous fuel during commissioning, as depicted at block 402. The first gaseous fuel may be natural gas having a particular heating value and other specific fuel properties. As indicated at block 404, the initial readings are utilized to calculate a corrected-pressure-drop reference value. In instances, as discussed above, the corrected-pressure-drop reference value is equivalent to an inverse of a molecular weight of the first gaseous fuel consumed during commissioning.

In particular embodiments, the corrected-pressure-drop reference value found when commissioning the control system may be plotted against a mass flow rate squared to derive a reference slope ($Slope_{NGref}$). Upon deriving the reference slope, decisions are then based on a relative comparison of current conditions (expressed by a dynamic slope) to the tuned condition (expressed by the reference slope). For instance, as the fuel properties change (e.g., temperature, pressure, and composition), the dynamic slope will increase or decrease, which is a direct result of a change in the Wobbe Index. As such, this comparison ensures that variations from the specific fuel properties of the fuel consumed at commissioning are detected.

As depicted at block 406, post-commissioning readings are taken from the GT engine when consuming a second gaseous fuel during commercial operation. In embodiments, the fuel properties of the second gaseous fuel substantially differ from those of the first gaseous fuel, even though the first and second gaseous fuels may be both natural gas. As depicted at block 408, the post-commissioning readings are utilized to calculate a fuel property parameter. Generally the fuel property parameter represents the ratio of the dynamic and reference slopes. Thus, the fuel property parameter is a unit-less number that indicates a variance of fuel property.

In embodiments, the fuel property parameter is calculated by initially determining a product of a pressure drop across one or more fuel nozzles that introduce the second gaseous fuel into a combustor and a determination of a value of the pressure of the second gaseous fuel at a point upstream of the combustor, as depicted by block 412. Typically, the pressure drop is influenced by the density of the fuel. By way of example, the lower the density of the fuel, there more fuel will be required to be transferred across the fuel nozzles to maintain a consistent/fixed amount of heat in the combustor. Because more fuel will be passed through the fuel nozzles, a higher pressure drop will occur across the orifices formed by the fuel nozzles.

As depicted at block 414, calculating the fuel property parameter further involves deriving a corrected-pressure-drop dynamic value by dividing the product by an upstream temperature reading of the second gaseous fuel. Next, as depicted at block 416, a ratio of the dynamic value and the reference value of the corrected pressure drop is solved. As discussed above, the denominator of the ratio generally represents the reference pressure drop in the tuned condition, while the numerator generally represents a corrected pressure drop being dynamically measured during the operating condition. Further, as mentioned above, the pressure drop may be used as a direct surrogate for the heating value and/or density of the fuel.

Upon determining the fuel property parameter, a target temperature is identified. The target temperature represents a temperature at which to adjust the second gaseous fuel such that the second gaseous fuel ostensibly exhibits the fuel properties of the first gaseous fuel during combustion within the GT engine. In instances, the target temperature represents a product of the fuel property parameter and the temperature reading of the second gaseous fuel. In operation, when the fuel property parameter is greater than a value of one, the target temperature is adjusted such that heating/cooling the fuel to the target temperature brings the fuel property parameter back to the value of one.

By way of clarification, because systems typically lack control over the gas composition, the temperature may be adjusted to control fuel properties in lieu of directly affecting the gas composition. Thus, upon adjusting the fuel temperature to bring the fuel property parameter back to a value substantially close to one, the temperature adjustment ostensibly enforces a general unity of fuel property parameters. Brining the FPP to a value substantially close to one may be realized upon the FPP being adjusted to a value within a predefined range of one.

Various benefits arising from automatic tuning can be realized when automatic tuning is compared against the current tuning processes. That is, because the tuning process of the present invention can be implemented automatically, the disadvantages of manually tuning are overcome. For instance, automatically tuning can be performed quickly and often, which will substantially prevent degradation that would have occurred before the manual tuning. Further, frequently tuning reduces excess pollutants/promotes lower emissions while improving engine life through reduced combustor dynamics.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A computerized method, implemented by a processing unit, for automatically tuning a combustor of a gas turbine (GT) engine for changes in fuel properties, the method comprising:
   accessing baseline readings taken from the GT engine when consuming a first gaseous fuel during a reference calibration;
   utilizing the baseline readings to calculate a corrected-pressure-drop reference value, wherein the corrected-pressure-drop reference value serves as a surrogate parameter to a heating value of the first gaseous fuel;
   receiving post-calibration readings from the GT engine when consuming a second gaseous fuel during commercial operation;
   utilizing the post-calibration readings to calculate a fuel property parameter via a process comprising:
   (a) reading a pressure drop across one or more fuel nozzles that introduce the second gaseous fuel into a combustor of the GT engine;
   (b) reading a pressure of the second gaseous fuel at a location upstream of the combustor;
   (c) calculating a product of the pressure drop and the upstream pressure of the second gaseous fuel;
   (d) deriving a corrected-pressure-drop dynamic value by dividing the product by an upstream temperature of the second gaseous fuel; and
   (e) solving a ratio of the dynamic value and the reference value to arrive upon the fuel property parameter; and
   employing the fuel property parameter to detect whether a corrective action is appropriate.

2. The computerized method of claim 1, wherein the corrected-pressure-drop reference value is substantially equivalent to an inverse of a molecular weight of the first gaseous fuel consumed during the reference calibration.

3. The computerized method of claim 1, wherein fuel properties of the second gaseous fuel substantially differ from fuel properties of the first gaseous fuel, while a type of fuel is consistent between the first gaseous fuel and the second gaseous fuel.

4. The computerized method of claim 1, wherein employing the fuel property parameter to detect whether a corrective action is appropriate comprises:
   providing a predefined threshold value, wherein the threshold value relates to a variation in heating value that causes an undetectable change in energy output of the GT engine; and
   comparing the fuel property parameter against the predefined threshold value.

5. The computerized method of claim 4, wherein employing the fuel property parameter to detect whether a corrective action is appropriate further comprises:
   when the fuel property parameter is greater than the predefined threshold value, invoking a corrective action; and
   when the fuel property parameter is greater than the predefined threshold value, abstaining from presently taking a corrective action.

6. The computerized method of claim 5, wherein invoking a corrective action comprises communicating to a temperature adjustment device an indication to adjust the upstream temperature of the second gaseous fuel.

7. The computerized method of claim 6, wherein the upstream temperature of the second gaseous fuel is adjusted according to a value of the fuel property parameter.

8. The computerized method of claim 7, wherein the upstream temperature of the second gaseous fuel is adjusted according to a value of the fuel property parameter.

9. The computerized method of claim 8, wherein adjusting the upstream temperature of the second gaseous fuel comprises:
   identifying a target temperature, wherein the target temperature represents a product of the fuel property parameter and the upstream temperature of the second gaseous fuel; and
   signaling the temperature adjustment device to warm or cool the second gaseous fuel to meet the target temperature, wherein, upon adjusting the second gaseous fuel to meet the target temperature, the second gaseous fuel exhibits the fuel properties of the first gaseous fuel during combustion within the GT engine.

10. The computerized method of claim 9, wherein, when the temperature adjustment device is unsuccessful in warming or cooling the second gaseous fuel to meet the target temperature, triggering an alarm to alert an operator of the GT engine.

11. The computerized method of claim 5, wherein invoking a corrective action comprises incrementally adjusting a fuel-flow split a predefined amount.

12. The computerized method of claim 1, further comprising generating a linear plot that depicts a relationship between the corrected-pressure-drop dynamic value and a square of a mass flow rate measured from the second gaseous fuel during commercial operation, wherein a slope of the linear plot represents a molecular weight of the second gaseous fuel being consumed by the combustor.

\* \* \* \* \*